(12) United States Patent
Masuda

(10) Patent No.: US 11,279,333 B2
(45) Date of Patent: Mar. 22, 2022

(54) VEHICLE CONTROL DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 308 days.

(21) Appl. No.: 16/554,876

(22) Filed: Aug. 29, 2019

(65) Prior Publication Data

US 2020/0017087 A1    Jan. 16, 2020

Related U.S. Application Data

(63) Continuation of application No. PCT/JP2018/007042, filed on Feb. 26, 2018.

(30) Foreign Application Priority Data

Mar. 3, 2017  (JP) .............................. JP2017-040022

(51) Int. Cl.
    *G06F 17/00* (2019.01)
    *B60T 8/1761* (2006.01)
    (Continued)

(52) U.S. Cl.
    CPC .......... *B60T 8/17616* (2013.01); *B60K 31/00* (2013.01); *B60T 7/12* (2013.01);
    (Continued)

(58) Field of Classification Search
    CPC ........ B60T 8/17616; B60T 7/12; B60T 8/171; B60T 8/321; B60T 2230/02;
    (Continued)

(56) References Cited

U.S. PATENT DOCUMENTS 8,886,381 B2 * 11/2014 Ozaki .................. B60K 7/0007
                                                              701/22
9,616,865 B2    4/2017 Yasui et al.
(Continued)

FOREIGN PATENT DOCUMENTS

CN        104039613 A      9/2014
CN        105882631 A      8/2016
(Continued)

OTHER PUBLICATIONS

Chinese Office Action dated Feb. 3, 2021, in corresponding Chinese Patent Application No. 201880014770.8.
(Continued)

*Primary Examiner* — Ronnie M Mancho

(57) ABSTRACT

The vehicle control device includes a speed calculation unit, a speed estimation unit, a motion feedback calculation unit, and a slip estimator. The speed calculation unit calculates a speed in a predetermined direction of a vehicle on the basis of a feature quantity. The speed estimation unit estimates a speed in the predetermined direction on the basis of a speed or acceleration detected by a motion detector. The motion feedback calculation unit performs feedback calculation in which a value obtained, through a proportional gain, from a deviation between a calculation speed calculated by the speed calculation unit and an estimation speed estimated by the speed estimation unit, is added to the feature quantity. The slip estimator compares the calculation speed with the estimation speed, and estimates that the vehicle is in a slip state in the predetermined direction, when the estimation speed exceeds the calculation speed.

6 Claims, 8 Drawing Sheets

(51) Int. Cl.
*B60K 31/00* (2006.01)
*B60T 7/12* (2006.01)
*B60T 8/171* (2006.01)
*B60T 8/32* (2006.01)

(52) U.S. Cl.
CPC .............. B60T 8/171 (2013.01); B60T 8/321 (2013.01); *B60T 2230/02* (2013.01); *B60T 2250/04* (2013.01); *B60T 2270/10* (2013.01)

(58) Field of Classification Search
CPC ............. B60T 2250/04; B60T 2270/10; B60T 13/741; B60K 31/00; B60K 28/16; B60W 2520/105; B60W 50/0098; B60W 2050/0008; B60W 2050/0024; B60W 2520/28
USPC .......................................................... 701/71
See application file for complete search history.

(56) References Cited

U.S. PATENT DOCUMENTS

| | | | |
|---|---|---|---|
| 9,975,537 B2 | 5/2018 | Yanagida et al. | |
| 10,029,678 B2 | 7/2018 | Mogi | |
| 2014/0111130 A1* | 4/2014 | Yamada | B60L 3/102 318/400.32 |
| 2015/0081186 A1 | 3/2015 | Yasui et al. | |
| 2016/0075256 A1* | 3/2016 | Zhang | B60L 3/12 701/22 |
| 2016/0107540 A1* | 4/2016 | Zhang | B60L 7/14 701/22 |
| 2016/0176313 A1* | 6/2016 | Li | B60L 50/51 701/22 |
| 2016/0193919 A1* | 7/2016 | Zhang | B60L 3/102 180/197 |
| 2016/0236672 A1 | 8/2016 | Yanagida et al. | |
| 2016/0243943 A1* | 8/2016 | Sugai | B60L 15/20 |
| 2017/0002881 A1* | 1/2017 | Masuda | B60T 13/741 |
| 2017/0037919 A1* | 2/2017 | Nishikawa | B60T 13/746 |
| 2017/0080926 A1 | 3/2017 | Mogi | |
| 2017/0108067 A1* | 4/2017 | Masuda | F16D 55/226 |
| 2017/0151981 A1* | 6/2017 | Suzuki | B62D 7/1509 |
| 2017/0166178 A1* | 6/2017 | Masuda | B60T 8/00 |
| 2018/0015909 A1 | 1/2018 | Masuda | |
| 2018/0099677 A1* | 4/2018 | Sugai | B60T 8/17551 |
| 2019/0176812 A1* | 6/2019 | Hirata | B60W 40/114 |
| 2019/0241176 A1* | 8/2019 | Suzuki | B60W 30/045 |

FOREIGN PATENT DOCUMENTS

| | | |
|---|---|---|
| CN | 2016-182884 A | 10/2016 |
| CN | 106458056 A | 2/2017 |
| JP | 4-293654 | 10/1992 |
| JP | 9-86378 | 3/1997 |
| JP | 2001-219839 | 8/2001 |
| JP | 2008-238956 | 10/2008 |
| JP | 2011-207308 A | 10/2011 |
| JP | 2016-150672 | 8/2016 |

OTHER PUBLICATIONS

English Translation by WIPO of the International Preliminary Report on Patentability dated Sep. 12, 2019 in corresponding International Patent Application No. PCT/JP2018/007042.
International Search Report dated May 15, 2018 in corresponding International Patent Application No. PCT/JP2018/007042.

* cited by examiner

VEHICLE CONTROL DEVICE

CROSS REFERENCE TO THE RELATED APPLICATION

This application is a continuation application, under 35 U.S.C. § 111(a), of international application No. PCT/JP2018/007042, filed Feb. 26, 2018, which is based on and claims Convention priority to Japanese patent application No. 2017-040022, filed Mar. 3, 2017, the entire disclosure of which is herein incorporated by reference as a part of this application.

BACKGROUND OF THE INVENTION

Field of the Invention

The present invention relates to a vehicle control device that controls behavior of a vehicle such as an automobile.

Description of Related Art

Hitherto, as a method for controlling a slip suppression control device for a vehicle, the following inventions have been proposed.
1. ABS control in which the upper limit of deceleration of each wheel is adjusted in accordance with an amount of change in depressing force (Patent Document 1).
2. Sideslip prevention control in which control is performed in accordance with the deviation between a model and an actual yaw rate (Patent Document 2).

RELATED DOCUMENT

Patent Document

[Patent Document 1] JP Laid-open Patent Publication No. H4-293654
[Patent Document 2] JP Laid-open Patent Publication No. H9-86378

In the case of performing slip suppression control for a vehicle on the basis of acceleration in a predetermined direction as described in Patent Document 1 or 2, a countermeasure against operation in which, due to instantaneous fluctuations caused by sensor noise, road surface irregularities, or the like, slip suppression control is undesirably performed in a situation where it is actually not necessary to perform slip suppression control, becomes an issue. As a countermeasure against such an issue, for example, in the case of using a low-pass filter or the like, intervention of slip suppression control may be delayed due to detection delay by the low-pass filter.

For example, in the wheel anti-lock control described in Patent Document 1, a wheel speed sensor that outputs a rotation pulse in synchronization with a wheel is generally used. Noise is easily generated due to a factor such as an error in pulse interval, and a high acceleration is calculated when calculating acceleration, so that the current situation may be determined as a situation where anti-lock control is required. In addition, also due to a factor such as road surface irregularities, a high acceleration may be calculated similarly.

For example, in the sideslip prevention control described in Patent Document 2, a high yaw rate may be generated instantaneously depending on conditions such as road surface irregularities. In addition, for example, due to influence of vibration of a vehicle body that is spring-coupled by a suspension or the like, a high yaw rate may be detected by an acceleration sensor or the like.

SUMMARY OF THE INVENTION

An object of the present invention is to provide a vehicle control device that controls a vehicle drive device and that is capable of causing slip suppression control to accurately and quickly intervene.

Hereinafter, in order to facilitate understanding of the present invention, the present invention will be described with reference to the reference numerals in embodiments for the sake of convenience.

A vehicle control device of the present invention is a vehicle control device 3 for controlling a vehicle drive device 4 in a vehicle including a vehicle operation device 1 for performing operation for at least either one of front-rear force and a turning direction of the vehicle, and a motion detector 2 capable of detecting a speed or acceleration in a predetermined direction of the vehicle, the vehicle drive device 4 being capable of generating at least either one of front-rear force and turning force of the vehicle on the basis of an operation input value with respect to the vehicle operation device 1, the vehicle control device 3 including:

a speed calculation unit 7a configured to calculate a speed in the predetermined direction of the vehicle on the basis of a feature quantity represented by at least one of the operation input value with respect to the vehicle operation device 1 and driving force of the vehicle drive device 4;

a speed estimation unit 8b configured to estimate a speed in the predetermined direction on the basis of the speed or the acceleration detected by the motion detector 2;

a motion feedback calculation unit 7b configured to perform feedback calculation in which a value is added to the feature quantity, the value being obtained, through a proportional gain, from a deviation between a calculation speed that is the speed in the predetermined direction calculated by the speed calculation unit 7a and an estimation speed that is the speed in the predetermined direction estimated by the speed estimation unit 8b; and a slip estimator 9 configured to compare the calculation speed calculated by the speed calculation unit 7a with the estimation speed estimated by the speed estimation unit 8b, and estimate that the vehicle is in a slip state in the predetermined direction, when the estimation speed exceeds the calculation speed.

The predetermined direction is a direction determined optionally through design or the like, and is determined by obtaining an appropriate direction through, for example, one or both of experiment and simulation.

According to this configuration, the speed calculation unit 7a calculates a speed in the predetermined direction of the vehicle on the basis of the feature quantity represented by at least one of the operation input value and the driving force. The speed estimation unit 8b estimates a speed in the predetermined direction on the basis of the speed or the acceleration detected by the motion detector 2. The slip estimator 9 compares the calculation speed calculated by the speed calculation unit 7a with the estimation speed estimated by the speed estimation unit 8b, and estimates that the vehicle is in a slip state in the predetermined direction, when the estimation speed exceeds the calculation speed.

The motion feedback calculation unit 7b adds the value obtained, through the proportional gain, from the deviation between the calculation speed and the estimation speed, to the feature quantity. In other words, a feedback calculation result is calculated such that the feedback calculation result has a predetermined steady deviation with respect to the estimation speed. As the simplest form, feedback with a predetermined steady deviation can be established by adding a value obtained, through the proportional gain, from a deviation obtained by subtracting the calculation speed from the estimation speed, as the operation input value or the like. For example, when the estimation speed exceeds the calculation speed, the vehicle control device 3 performs slip suppression control. The steady deviation is a parameter that influences the accuracy of the slip estimator determining whether or not the current state is a slip state.

In particular, comparison between the calculation speed and the estimation speed enables determination as to whether to cause slip suppression control to intervene, and thus, for example, determination as to whether to cause slip suppression control to intervene can be performed with less erroneous determination due to noise or the like than in the conventional art in which slip suppression control for a vehicle is performed on the basis of acceleration. Since feedback calculation with a predetermined steady deviation with respect to the estimation speed is performed, the calculation speed by the speed calculation unit 7a can be prevented from greatly deviating from the estimation speed by the speed estimation unit 8b. Therefore, slip suppression control can be caused to intervene accurately, in other words, with high accuracy. In addition, when the estimation speed exceeds the calculation speed, the slip estimator 9 estimates that the vehicle is in a slip state in the predetermined direction. When it is estimated that the vehicle is in such a slip state, it is possible to perform slip suppression control, and thus slip suppression control can be caused to intervene more quickly than slip suppression control in which a low-pass filter or the like is used, or the like.

The speed calculation unit 7a may correct the calculation speed by the speed calculation unit 7a through the feedback calculation only for a direction opposite to an exceeding direction (when compared with the calculation speed) of the estimation speed by the speed estimation unit 8b in which the vehicle can be determined to be in a slip state in the predetermined direction.

According to this configuration, in the motion feedback calculation unit 7b, in order to prevent the calculation speed by the speed calculation unit 7a from greatly deviating from the estimation speed, which is, for example, the actual vehicle speed, to the slip side (that is, tending to shift to the side in which "estimation speed—calculation speed >0" is satisfied), it is necessary to perform feedback calculation on the basis of the deviation between the calculation speed and the estimation speed such that the calculation speed is increased. On the other hand, a situation where the calculation speed by the speed calculation unit 7a, for example, deviates from an actual vehicle speed to the non-slip side is determined by the slip estimator 9 as an excessive slip state such as locking tendency in braking operation, and thus in such a situation, it is not necessary to perform feedback calculation such that the calculation speed is decreased. Therefore, the calculation speed is corrected by the speed calculation unit 7a through the feedback calculation only for the direction opposite to the exceeding direction of the estimation speed by the speed estimation unit 8b in which the vehicle can be determined to be in a slip state. Since the feedback calculation is performed in a limited manner as described above, the calculation speed can be used for determining a slip when the current state is not an excessive slip state, and can be used as a reference speed for suppressing a slip when an excessive slip state has occurred.

The speed calculation unit 7a may add, to the feature quantity, a determined bias value for driving the vehicle in a direction that coincides with an exceeding direction of the estimation speed by the speed estimation unit 8b in which the vehicle can be determined to be in a slip state, the feature quantity represented by at least one of the operation input value with respect to the vehicle operation device 1 and the driving force of the vehicle drive device 4. The determined bias value is a value determined optionally through design or the like, and is determined by obtaining an appropriate value through, for example, one or both of experiment and simulation. According to this configuration, by adding the determined bias value to the operation input value or the like, a calculation speed to be calculated with respect to the operation input value or the like is calculated such that the calculation speed has a bias on the slip side with respect to the estimation speed which is, for example, the actual vehicle speed. Accordingly, for example, mainly when the vehicle operation device 1 is not operated, or when the vehicle operation device 1 is slightly operated, the slip estimator 9 can be prevented from erroneously determining a slip state.

The vehicle drive device 4 may be a wheel drive device configured to provide rotary torque to a wheel of the vehicle, the speed calculation unit 7a may calculate an angular speed of the wheel that is synchronous with a front-rear speed of the vehicle based on calculation including the rotary torque of the wheel based on the feature quantity and a weight of the vehicle, the vehicle motion estimator 8 may estimate an angular speed of the wheel on the basis of a detection value of a motion detector 2 configured to detect at least any of angular acceleration, an angular speed, and an angle of the wheel, and the slip estimator 9 may estimate a slip rate of the wheel based on comparison between the angular speed of the wheel estimated by the speed estimation unit 8b and the angular speed of the wheel calculated by the speed calculation unit 7a.

The vehicle drive device 4 may include a plurality of wheel drive devices capable of being independently controlled, the slip estimator 9 may have a function of performing determination as to a slip state for each of wheels driven by the plurality of wheel drive devices, and the speed calculation unit 7a may perform the feedback calculation only on the estimation speed by the speed estimation unit 8b for wheels that are determined to not be in a slip state by the slip estimator 9.

In this case, by excluding, from the feedback calculation, the estimation speed by the speed estimation unit 8b for the wheel determined to be in a slip state, slip suppression control can be caused to intervene with high accuracy.

The vehicle operation device 1 may be a brake operation device 1A, the vehicle drive device 4 may be a brake device 4A, and the speed calculation unit 7a may calculate a speed in the predetermined direction of the vehicle on the basis of either one of or both an operation input value by the brake operation device 1A and driving force of the brake device 4A. With the configuration in which a speed is calculated on the basis of the operation input value by the brake operation device 1A, the configuration is made simple. With the configuration in which a speed is calculated on the basis of the driving force of the brake device 4A, the accuracy of calculation of the speed calculation unit 7a improves.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

An embodiment of the present invention will be described with reference to FIG. 1 to FIG. 6.

<Schematic Configuration of Vehicle Control Device, Etc., Mounted on Vehicle>

Figure 1:
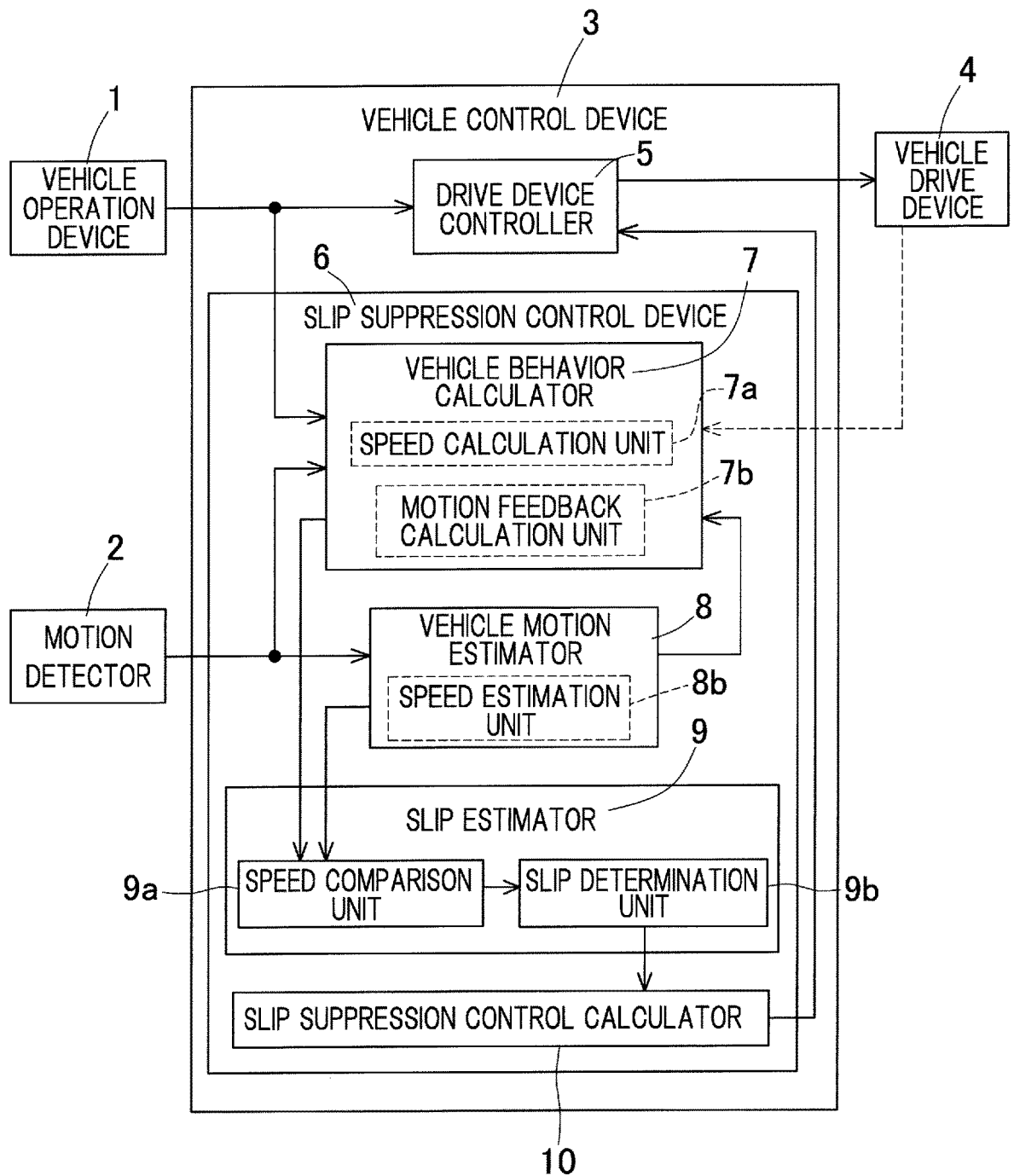
FIG. 1 is a block diagram of a conceptual configuration of a vehicle control device according to an embodiment of the present invention.

FIG. 1 is a block diagram of a conceptual configuration of a vehicle control device for a vehicle such as an automobile. The vehicle includes a vehicle operation device 1, a motion detector 2, a vehicle control device 3, and a vehicle drive device 4. The vehicle operation device 1 performs operation for at least either one of front-rear force and turning force of the vehicle, and may be, for example, at least any one of an accelerator operation device 1B (FIG. 7), a brake operation device 1A (FIG. 7), a steering wheel, and the like.

The motion detector 2 is capable of detecting a speed or acceleration in a determined direction of the vehicle, and, for example, wheel speed sensors that detect wheel speeds of respective wheels are used therefor. The vehicle control device 3 controls the vehicle drive device 4 on the basis of an operation input value with respect to the vehicle operation device 1. The vehicle drive device 4 is capable of generating at least either one of front-rear force and turning force of the vehicle, and may be, for example, at least any one of a vehicle drive motor for running, a friction brake, and a steering device.

<Detailed Configuration of Vehicle Control Device 3>

The vehicle control device 3 includes a drive device controller 5 and a slip suppression control device 6. The drive device controller 5 is, for example, a motor control device that drives a vehicle drive motor or an electric brake device motor.

<<Slip Suppression Control Device 6, Etc.>>

The slip suppression control device 6 is a device capable of performing slip suppression control and includes a vehicle behavior calculator 7, a vehicle motion estimator 8, a slip estimator 9, and a slip suppression control calculator 10. The vehicle behavior calculator 7 calculates a speed in a predetermined direction of the vehicle on the basis of at least one of an operation input value with respect to the vehicle operation device 1 and driving force of the vehicle drive device 4. The vehicle behavior calculator 7 includes a speed calculation unit 7a and a motion feedback calculation unit 7b.

For example, the speed calculation unit 7a performs calculation of a speed in the predetermined direction with respect to an operation input (operation input value) for acceleration/deceleration or turning with respect to the vehicle operation device 1 on the basis of a vehicle behavior model. As the simplest example, by regarding the vehicle as a mass or moment of inertia, a speed in the front-rear direction (front-rear speed) of the vehicle when a front-rear acceleration force is applied to the vehicle can be obtained as the integral value of a value obtained by dividing the acceleration force by the mass or moment of inertia. Alternatively, a speed in a turning direction (turning speed) when turning moment is given by braking/driving force distribution and steering force with respect to moment of inertia about the center of gravity of the vehicle can also be obtained similarly.

The vehicle behavior model is provided as appropriate in accordance with vehicle behavior to be controlled by the slip suppression control device 6. In addition, as an operation input value (included in a feature quantity) to be used by the speed calculation unit 7a for calculation, for example, an operation amount on the vehicle operation device 1, that is, a command input value to the drive device controller 5, may be used. Further, the speed calculation unit 7a may estimate driving force by using a sensor or the like (not shown) that detects driving force of the vehicle drive device 4 and may perform speed calculation on the basis of the estimated driving force (included in the feature quantity). With the configuration using an operation amount on the vehicle operation device 1, the configuration is made simple. Moreover, with the configuration in which driving force of the vehicle drive device 4 is detected, the accuracy of calculation of the speed calculation unit 7a improves.

The motion feedback calculation unit 7b performs feedback calculation such that the speed in the predetermined direction calculated by the speed calculation unit 7a (calculation speed) is caused to follow a speed in the predetermined direction of the vehicle estimated by the later-described vehicle motion estimator 8 (estimation speed). At this time, a feedback calculation result is calculated such that the feedback calculation result has a predetermined steady deviation with respect to the estimation speed. As the simplest form, feedback with a steady deviation is established by adding or subtracting a value (an operation input value) obtained, through a predetermined proportional gain G (FIG. 4), from a value (deviation) obtained by subtracting the calculation speed from the estimation speed.

The steady deviation is a parameter that influences the accuracy of the later-described slip estimator 9 determining whether or not the current state is a slip state, and the proportional gain is determined as appropriate in consideration of trade-off between improvement in slip suppression control performance by increasing the accuracy of the determination and a risk of erroneous determination. At this time, the proportional gain may be a fixed value or a variable value. The proportional gain may be, for example, a variable value that varies in accordance with a state of the vehicle that is estimated on the basis of an operation state of the vehicle operation device, a road surface condition, and the like.

The vehicle motion estimator 8 estimates a motion of the vehicle as in each example described later, such as a front-rear speed and a turning speed of the vehicle or a rotation direction and an angular speed of each wheel, on the basis of output of the motion detector 2 or the like, and has a speed estimation unit 8b that estimates a speed in the predetermined direction on the basis of the speed or the acceleration detected by the motion detector 2. For example, the speed estimation unit 8b of the vehicle motion estimator 8 may estimate a speed by performing unit conversion of a value that depends on the speed outputted from the motion detector 2, or may obtain a speed by performing integration and unit conversion of a value that depends on the acceleration outputted from the motion detector 2.

The slip estimator 9 compares the calculation speed calculated by the speed calculation unit 7a with the estimation speed estimated by the speed estimation unit 8b, and, when the estimation speed exceeds the calculation speed, the slip estimator 9 estimates that the vehicle is in a slip state in the predetermined direction. The slip estimator 9 includes a speed comparison unit 9a and a slip determination unit 9b. The speed comparison unit 9a compares the calculation speed by the speed calculation unit 7a with the estimation speed by the speed estimation unit 8b. On the basis of the result of the comparison, the slip determination unit 9b determines whether or not the vehicle is in a slip state that is not a normal state. For example, the slip determination unit 9b is capable of determining whether the vehicle is in a slip state or in a locked state, from a slip rate of each wheel based on comparison between a calculated angular speed and an estimated angular speed for an angular speed of the wheel. In addition, the slip determination unit 9b is capable of determining, for example, whether the vehicle is in an oversteer (spin) state or in an understeer (turning force shortage) state, on the basis of comparison between a calculated turning speed and an estimated turning speed for a turning speed of the vehicle.

The slip suppression control calculator 10 outputs a control intervention command to the drive device controller 5 on the basis of the result of the slip estimator 9. For example, the slip suppression control calculator 10 may suppress a locked state by outputting a command for decreasing braking force. In addition, the slip suppression control calculator 10 may suppress a wheel spin state by outputting a command for decreasing driving force. Moreover, the slip suppression control calculator 10 may suppress an oversteer/understeer state by outputting a command for changing braking/driving force distribution.

The configuration in the block diagram of FIG. 1 is conceptually provided, and division/integration of the functions can be made as appropriate. For example, the vehicle drive device 4 may include a motor and a motor control device, and the drive device controller 5 may be an integrated control calculator such as a VCU. In addition, in a self-driving vehicle or the like, an integrated control calculator may be provided in the vehicle operation device 1, and a value corresponding to an output value for vehicle operation by the vehicle operation device 1 may be outputted from the integrated control calculator.

Figure 2:
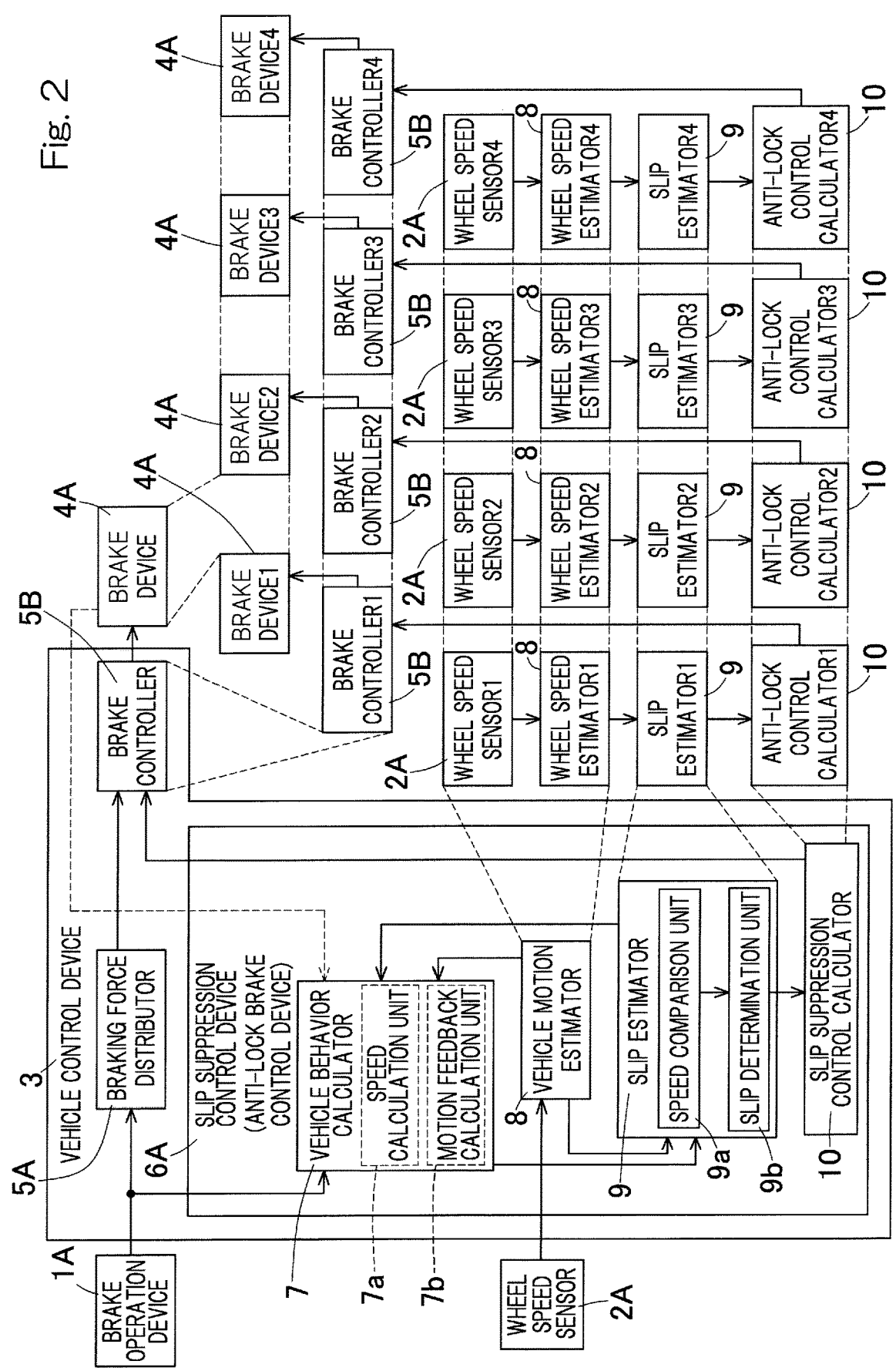
FIG. 2 is a block diagram showing a conceptual configuration of an anti-lock brake control device that is a slip suppression control device in the vehicle control device.

FIG. 2 is a diagram showing a configuration example of an anti-lock brake control device 6A that prevents lock of each wheel during braking, as the slip suppression control device in the vehicle control device 3. A description will be given also with reference to FIG. 1. The brake operation device 1A such as a brake pedal is provided as the vehicle operation device 1, and wheel speed sensors 2A are provided as the motion detector 2. A braking force distributor 5A and brake controller 5B are provided as the drive device controller 5. Brake devices 4A are provided as the vehicle drive device 4. A braking command inputted from the brake operation device 1A is distributed from the braking force distributor 5A to each brake controller 5B, and the brake devices 4A are controlled by the brake controller 5B.

Each function unit within the block of the anti-lock brake control device 6A shown in FIG. 2 is used as each function unit of the slip suppression control device 6. Each function unit in FIG. 2 corresponding to each function unit in FIG. 1 is designated by a reference numeral that is the same as in FIG. 1. In the configuration example in FIG. 2, the vehicle behavior calculator 7 is a vehicle speed calculator, and each vehicle motion estimator 8 is a wheel speed estimator. In addition, the speed comparison unit 9a of each slip estimator 9 is a wheel speed comparison unit, and each slip suppression control calculator 10 is an anti-lock control calculator. Furthermore, in the configuration example in FIG. 2, an example in which an operation input to the brake operation device 1A is used for calculation by the vehicle speed calculator is shown, but the present invention is not limited to this example. Instead of this example, or together with this example, for example, a vehicle body front-rear acceleration sensor (not shown) that detects driving force of each brake device 4A is provided, and output of the front-rear acceleration sensor or the like may be used for calculation by the vehicle speed calculator. For example, each brake device 4A may be a friction brake device, or may be a motor device capable of independently driving each wheel, typified by an in-wheel motor.

Figure 3:
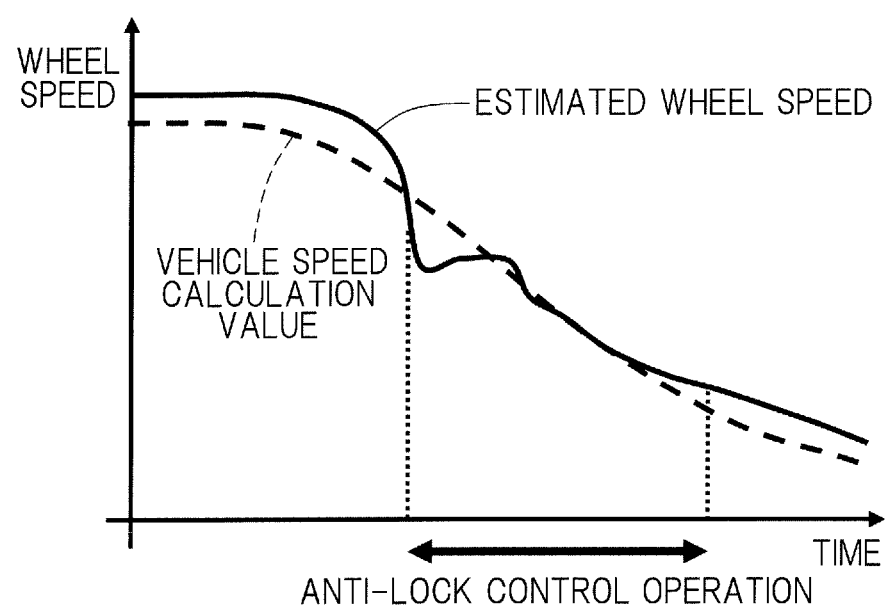
FIG. 3 is a diagram showing a relationship between an actual wheel speed and a vehicle speed calculation value.

FIG. 3 is a diagram showing a relationship between an actual wheel speed and a vehicle speed calculation value. In FIG. 3, a solid line indicates an estimated wheel speed (corresponding to an actual wheel speed), and a broken line indicates a calculated vehicle speed (vehicle speed calculation value). As shown in FIG. 2 and FIG. 3, the wheel speed comparison unit 9a of each slip estimator 9 compares a vehicle speed (calculated vehicle speed) calculated by the vehicle behavior calculator 7 with a wheel speed (estimated wheel speed) estimated by the vehicle motion estimator 8. When the estimated wheel speed is lower than the calculated vehicle speed in the result of the comparison by the wheel speed comparison unit 9a, the slip determination unit 9b can determine that the wheel is, for example, in an excessive slip state such as wheel locking tendency. In other words, the calculated vehicle speed is used as a threshold, and, in a situation where the estimated wheel speed exceeds the threshold on the deceleration side, the slip determination unit 9b determines that the wheel is in an excessive slip state.

When deceleration of the vehicle body speed that is calculated with respect to a predetermined brake operation input by the speed calculation unit 7a of the vehicle behavior calculator 7 becomes lower than deceleration in a state where an excessive slip state has not actually occurred, a possibility that the slip determination unit 9b will erroneously determine that the current state is a slip state, arises. Thus, the speed calculation unit 7a preferably performs calculation such that the deceleration of the vehicle body speed is at least higher than deceleration that actually occurs. That is, the speed calculation unit 7a of the vehicle behavior calculator 7 may be configured to use, as an input, a value obtained by adding a predetermined bias value to a brake operation input or the like used as an input such that the input is increased.

In the motion feedback calculation unit 7b of the vehicle behavior calculator 7, in order to prevent the calculation speed by the speed calculation unit 7a from greatly deviating from an actual vehicle speed to the deceleration side, that is, to the slip side, it is necessary to perform feedback calculation on the basis of the deviation between the calculation speed by the speed calculation unit 7a and the estimation speed by the vehicle motion estimator 8 such that the calculated vehicle speed is increased. On the other hand, a situation where the calculation speed by the speed calculation unit 7a deviates from an actual vehicle speed to the non-slip side is a situation where the current state is determined by the slip estimator 9 as an excessive slip state such as locking tendency in braking operation, and thus in such a situation, it is not necessary to perform feedback calculation such that the calculated vehicle speed is decreased.

Figure 4:
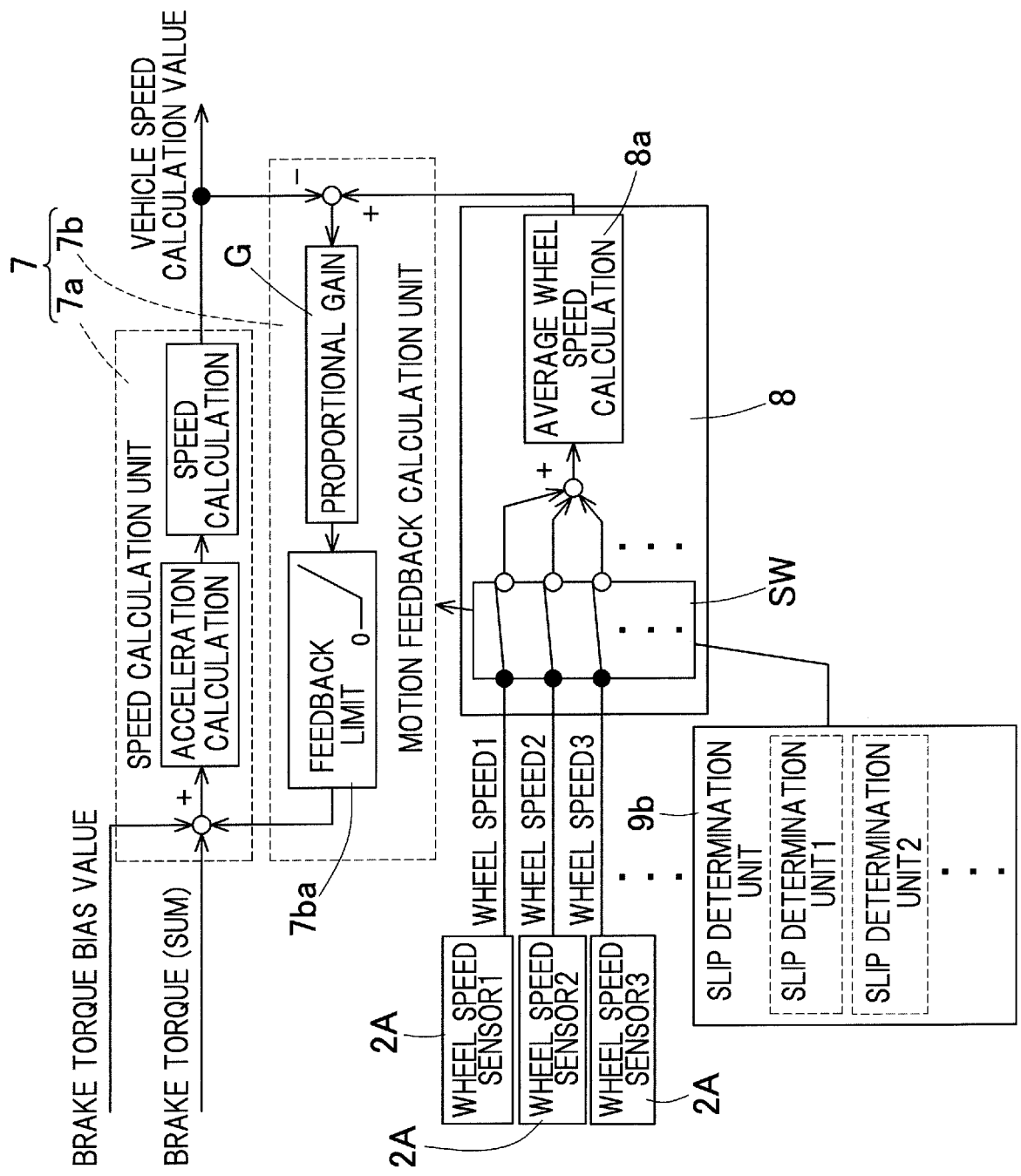
FIG. 4 is a block diagram showing the configuration of a vehicle behavior calculator, etc., of the anti-lock brake control device.

Specifically, as shown in FIG. 4, the motion feedback calculation unit 7b feeds back, as an operation input value, a value obtained through the predetermined proportional gain G from the deviation between the calculated vehicle speed and the estimated wheel speed. In other words, the motion feedback calculation unit 7b performs feedback calculation in which the value obtained by multiplying the predetermined proportional gain G to the deviation between the calculated vehicle speed and the estimated wheel speed is added to the operation input value (feature quantity). In this case, the motion feedback calculation unit 7b preferably has a function unit 7ba with one side limiter operation in which a deviation that further decreases the calculated vehicle speed is corrected to zero. In addition, in the case where the speed calculation unit 7a performs speed calculation on the basis of driving force of the vehicle drive device 4, the motion feedback calculation unit 7b may perform feedback calculation in which the value obtained through the predetermined proportional gain G from the deviation between the calculated vehicle speed and the estimated wheel speed is added to the driving force of the vehicle drive device 4.

Furthermore, as the estimated wheel speed to be used by the motion feedback calculation unit 7b for feedback, the average of estimated wheel speeds of the multiple wheels based on the respective wheel speed sensors 2A provided to the respective wheels may be generally used, or the highest wheel speed among the estimated vehicle speeds may be used.

As shown in FIG. 2, the anti-lock control calculator, which is the slip suppression control calculator 10, provides a braking command for decreasing braking force, to each brake controller 5B, in accordance with a slip state estimated by the slip estimator 9. Accordingly, the braking force of each brake device 4A is decreased, whereby a slip state is suppressed.

<<Detailed Configuration of Vehicle Behavior Calculator, Etc.>>

FIG. 4 is a block diagram showing the configuration of the vehicle behavior calculator, etc., of the anti-lock brake control device 6A in FIG. 2. As shown in FIG. 4, for example, the sum of brake torque may be obtained by estimating brake force that can be generated, from a brake pedal operation amount or the like in advance, or estimation values of functions that are provided to estimate current brake force of respective brake actuators (not shown) may be used.

When a function of estimating current brake force is provided to the anti-lock brake control device 6A in the case where each brake device 4A (FIG. 2) is, for example, an electric brake device in which an electric motor and a linear motion actuator such as a later-described linear motion mechanism are used, brake force may be estimated by using a pressing force sensor that detects so-called axial force of the linear motion actuator. When a function of estimating current brake force is provided to the anti-lock brake control device 6A in the case where each brake device 4A (FIG. 2) is, for example, a hydraulic brake device in which a hydraulic booster, an electromagnetic valve, and the like are used, brake force may be estimated by using a fluid pressure sensor that detects an oil pressure. Alternatively, for example, an acceleration sensor that detects front-rear acceleration of the vehicle body may be provided, and the sum of brake torque may be calculated from the front-rear acceleration detected by the acceleration sensor, equivalent inertia of the vehicle, and the like.

Figure 5:
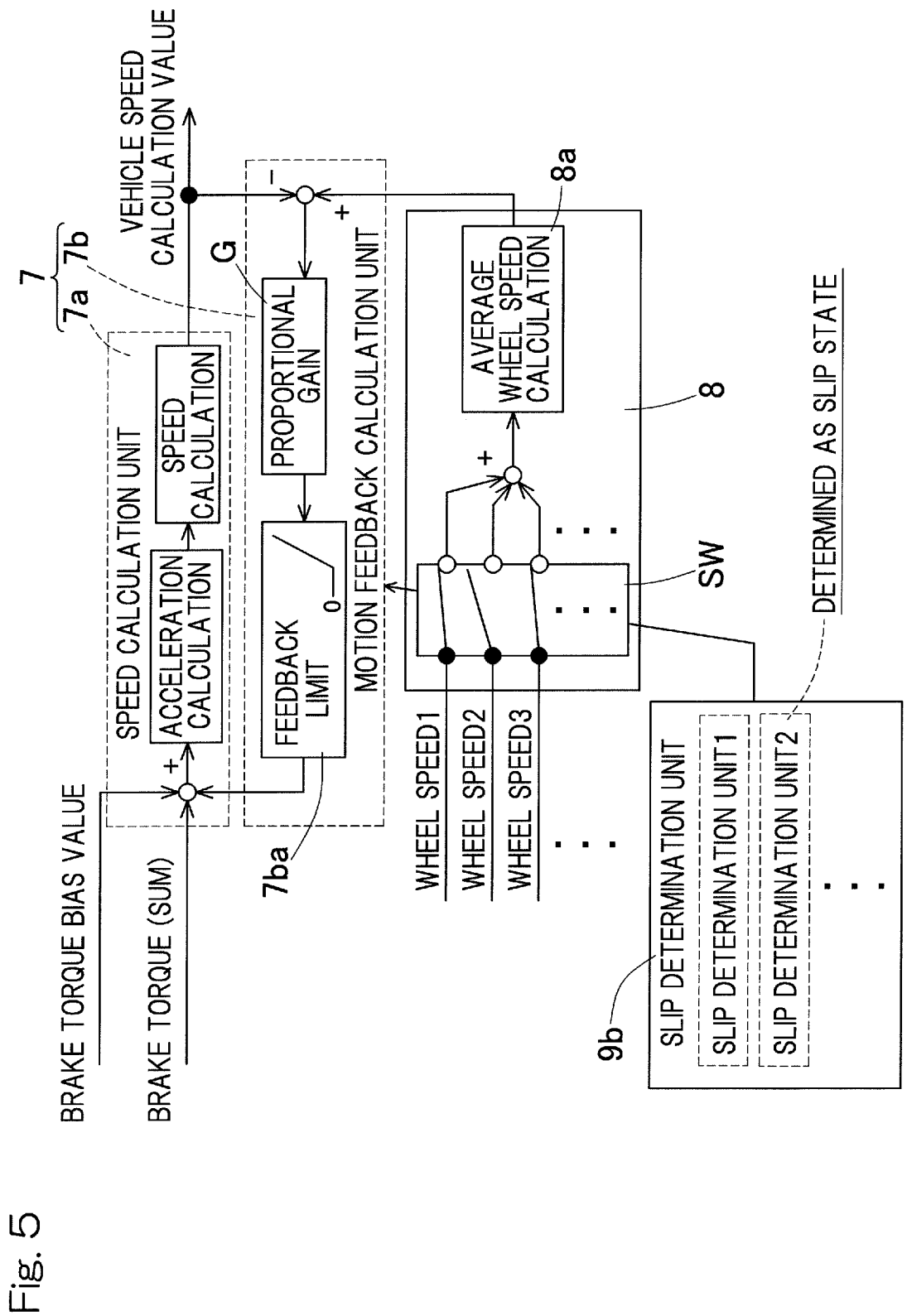
FIG. 5 is a block diagram showing a configuration in the case where the current state is determined as a slip state by a slip estimator of the slip suppression control device.

Moreover, in the configuration in FIG. 4, the vehicle motion estimator 8 includes an average wheel speed calculation unit 8a that calculates the average of multiple wheel speeds detected by the respective wheel speed sensors 2A. An example in which the average of the multiple wheel speeds calculated by the average wheel speed calculation unit 8a is used for feedback calculation with the vehicle speed calculation value, is shown. In this example, when a certain wheel is determined to be in a slip state by the slip determination unit 9b, the speed of the wheel determined to be in a slip state (in the shown example, a wheel speed 2) is preferably excluded from calculation for feedback as shown in FIG. 5. In other words, as shown in FIG. 1 and FIG. 2, the vehicle speed calculator, which is the vehicle behavior calculator 7, performs feedback calculation only on the estimation speeds by the vehicle motion estimator 8 for the wheels that are determined to not be in a slip state by the slip estimator 9. Accordingly, slip suppression control can be caused to intervene with high accuracy.

In addition to the example shown in FIG. 4 and FIG. 5, for example, a wheel speed having a highest angular speed among the multiple wheel speeds can be used as a wheel speed used for feedback calculation. In this case, a function unit SW shown as a switch diagram in FIG. 4 and FIG. 5 is not required, and a function of calculating the maximum value of each wheel speed can be provided.

<<Example of Brake Device>>

Figure 6:
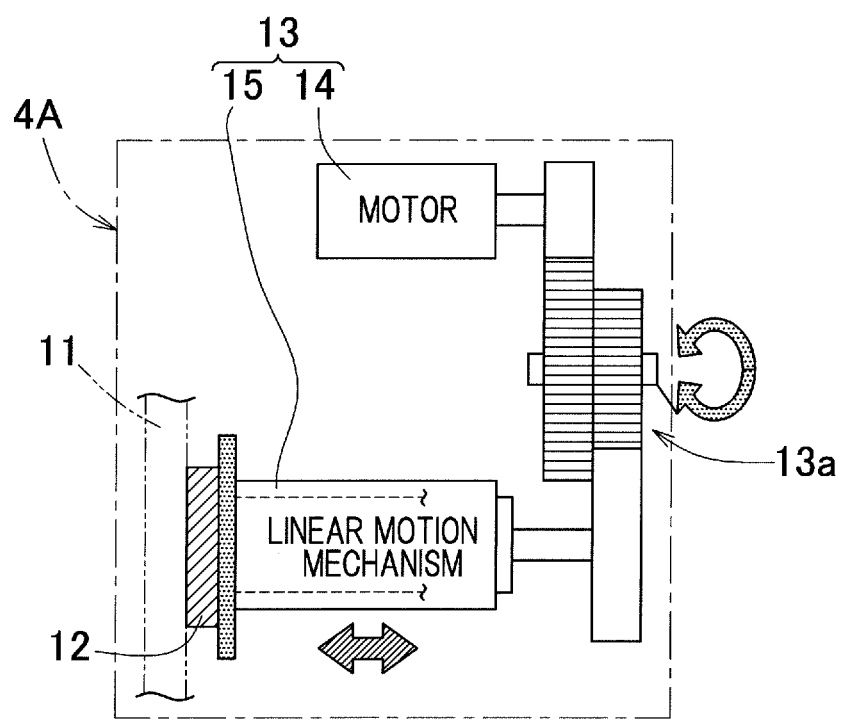
FIG. 6 is a diagram showing an example of a brake device to be controlled by the anti-lock brake control device.

FIG. 6 is a diagram showing an example of the brake device 4A to be controlled by the anti-lock brake control device. The brake device 4A is provided to each wheel of the vehicle, that is, to each of right and left wheels that are front wheels and right and left wheels that are rear wheels. The brake device 4A includes a brake rotor 11 that is disposed coaxially with the wheel, a friction member 12 that is brought into contact with the brake rotor 11, and a friction member drive mechanism 13 that operates the friction member 12.

The friction member 12 is composed of a brake pad or the like. The friction member drive mechanism 13 may be of an electric type or a hydraulic type. In the shown example, the friction member drive mechanism 13 is of an electric brake device and includes an electric motor 14 and a linear motion mechanism 15 that converts rotation of the motor 14 into a reciprocating linear motion of the friction member 12. As the linear motion mechanism 15, for example, a ball screw device, a planetary roller screw mechanism, or the like is used. Rotation of the motor 14 is transmitted to the linear motion mechanism 15, for example, via a speed-reducing mechanism 13a such as a gear train. A disc type is shown as the brake rotor 11 in the shown example, but the brake rotor 11 may be of a drum type.

Advantageous Effects

In the slip suppression control device described above, the motion feedback calculation unit 7b adds the value obtained through the proportional gain G from the deviation between the calculation speed and the estimation speed, to the feature quantity. In other words, a feedback calculation result is calculated such that the feedback calculation result has a predetermined steady deviation with respect to the estimation speed. As the simplest form, feedback with a predetermined steady deviation is established by adding a value obtained by multiplying the proportional gain G to a deviation obtained by subtracting the calculation speed from the estimation speed, as a steady deviation, as the operation input value or the like. When the estimation speed exceeds the calculation speed, the slip suppression control calculator 10 of the vehicle control device 3 performs slip suppression control. The steady deviation is a parameter that influences the accuracy of the slip estimator 9 determining whether or not the current state is a slip state.

In particular, comparison between the calculation speed and the estimation speed enables determination as to whether to cause slip suppression control to intervene, and thus, for example, determination as to whether to cause slip suppression control to intervene can be performed with less erroneous determination due to noise or the like than in the conventional art in which slip suppression control for a vehicle is performed on the basis of acceleration. Since feedback calculation with a predetermined steady deviation with respect to the estimation speed is performed, the calculation speed by the speed calculation unit 7a can be prevented from greatly deviating from the estimation speed by the speed estimation unit 8b. Therefore, slip suppression control can be caused to intervene accurately, in other words, with high accuracy. In addition, when the estimation speed exceeds the calculation speed, the slip estimator 9 estimates that the vehicle is in a slip state in the predetermined direction. When it is estimated that the vehicle is in such a slip state, it is possible to perform slip suppression control, and thus slip suppression control can be caused to intervene more quickly than slip suppression control in which a low-pass filter or the like is used, or the like.

Other Embodiments

In the following description, parts corresponding to the matters described in the preceding embodiment are designated by the same reference numerals, and the redundant description thereof is omitted. When only a part of a configuration is described, the remaining part of the configuration is the same as that described in the preceding embodiment, unless otherwise specified. The same advantageous effects are achieved by the same configuration. A combination of parts that are specifically described in respective embodiments can be implemented, and, further, embodiments may be partially combined unless such combination causes any problem.

Figure 7:
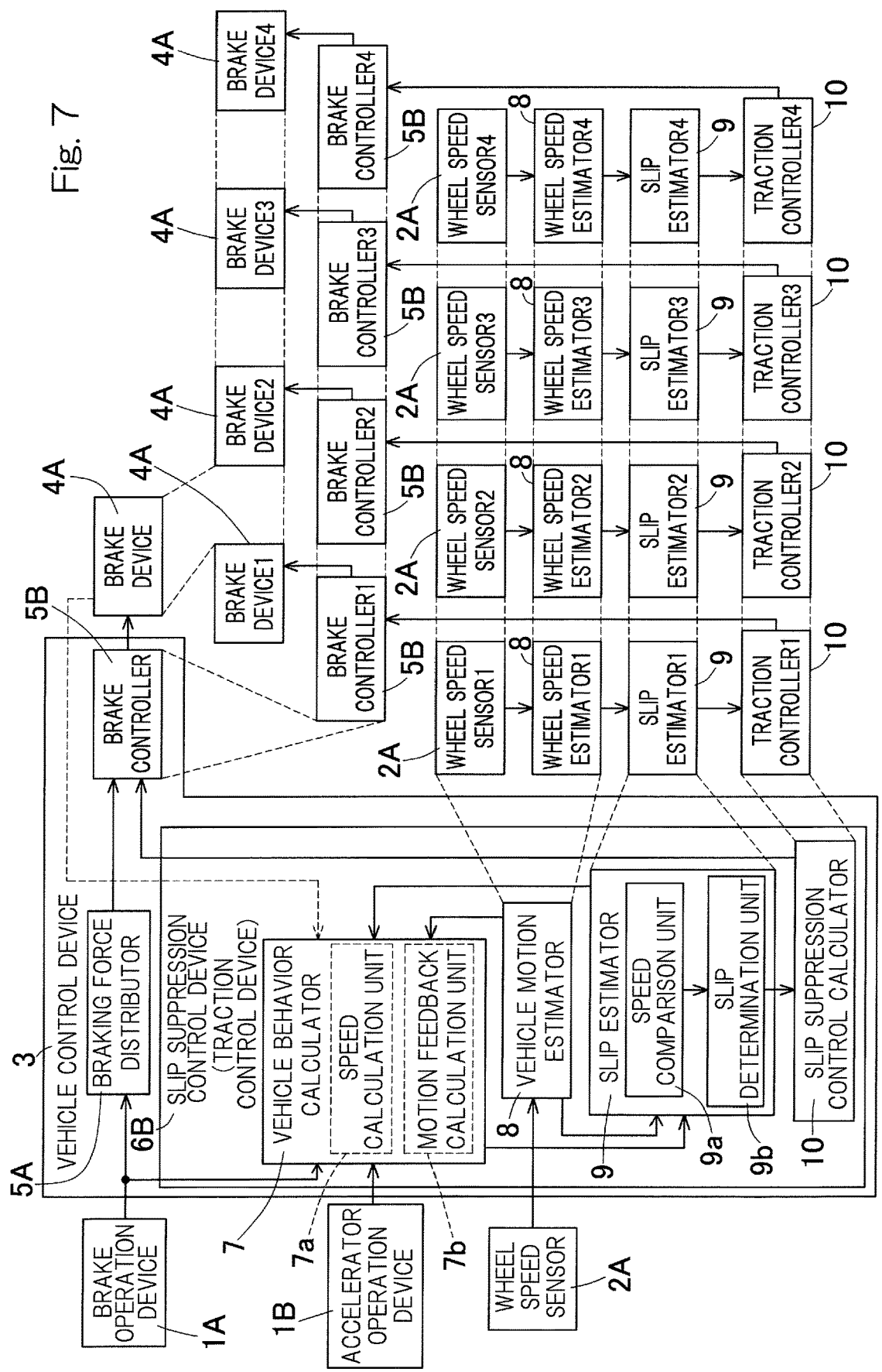
FIG. 7 is a block diagram showing a conceptual configuration in which a slip suppression control device in a vehicle control device according to another embodiment of the present invention is applied to a traction control device.

FIG. 7 shows a configuration example of a traction control device 6B that prevents excessive revolution of a wheel without grabbing such as wheel spin at the time of start of the vehicle. In the configuration example, the traction control device 6B is used as a slip suppression control device 6B in the vehicle control device. In the traction control device 6B, the vehicle behavior calculator 7 is a vehicle speed calculator, and each vehicle motion estimator 8 is a wheel speed estimator. In addition, the speed comparison unit 9a of each slip estimator 9 is a wheel speed comparison unit, and each slip suppression control calculator 10 is a traction control calculator. The traction control device 6B can be configured by configuring each slip estimator 9 in FIG. 7 such that the relationship between acceleration and deceleration is inverted from that in the embodiment shown in FIG. 2, for example, a condition for determining a slip is changed from exceeding to the deceleration side to exceeding to the acceleration side.

Figure 8:
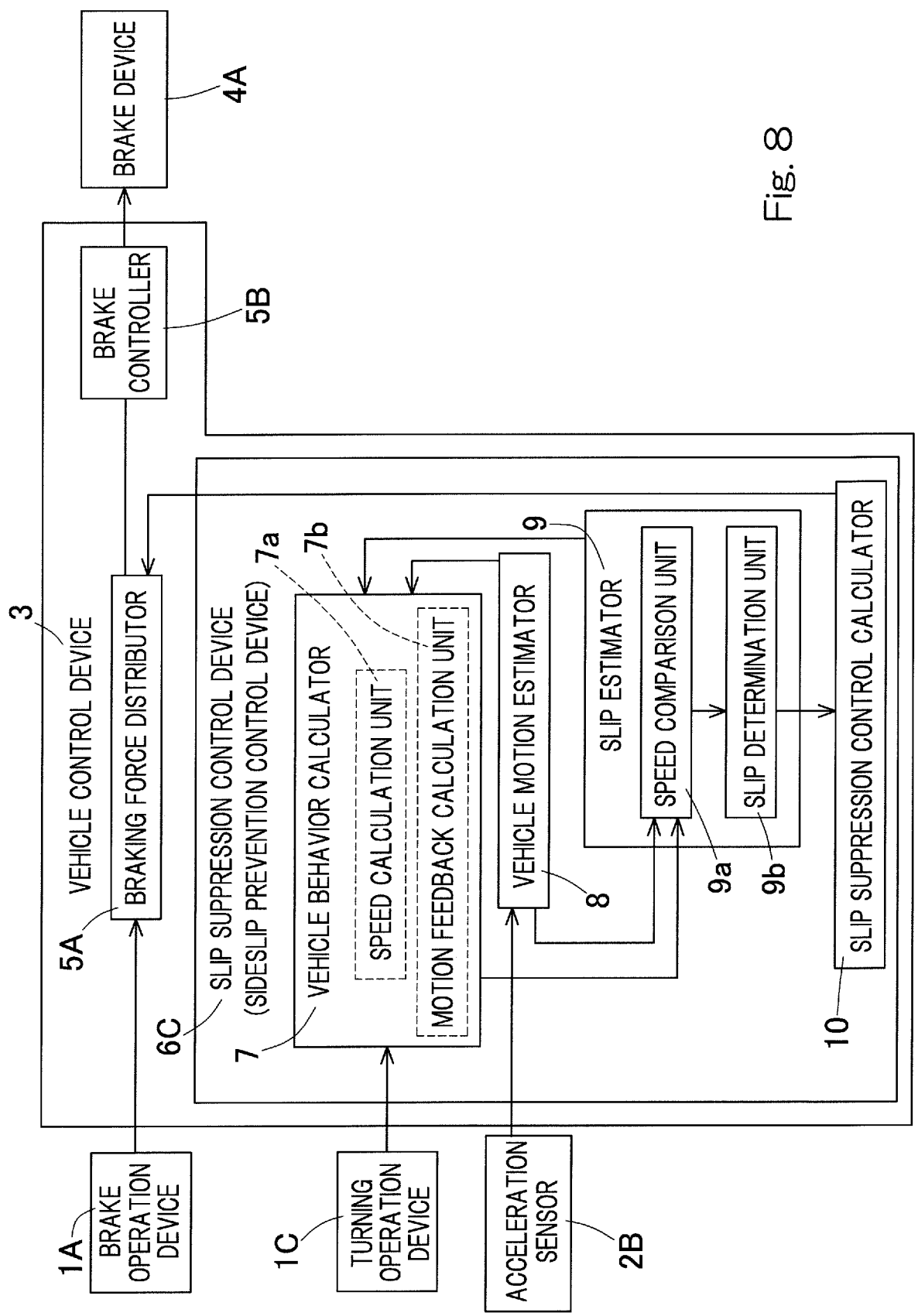
FIG. 8 is a block diagram showing a conceptual configuration in which a slip suppression control device in a vehicle control device according to still another embodiment of the present invention is applied to a sideslip prevention control device.

FIG. 8 shows a configuration example of a sideslip prevention control device 6C that prevents excessive sideslip during turning of the vehicle. In the configuration example, a slip suppression control device 6C is the sideslip prevention control device 6C. Instead of an operation input from the brake operation device 1A to the vehicle behavior calculator 7 (FIG. 1), an operation input from a turning operation device 1C including a steering wheel to the vehicle behavior calculator 7 is performed in the configuration example in FIG. 8. The vehicle behavior calculator 7 in this example is a standard turning speed calculator. The motion detector 2 (FIG. 1) is an acceleration sensor 2B. The drive device controller 5 (FIG. 1) is a braking force distributor 5A and a brake controller 5B. The vehicle drive device 4 (FIG. 1) is a brake device 4A.

Moreover, the vehicle motion estimator 8 is a turning speed estimator, and the speed comparison unit 9a of the slip estimator 9 is a turning speed comparison unit. Furthermore, the slip suppression control calculator 10 is a sideslip prevention control calculator. For example, the brake device 4A may be a friction brake device, or may be a motor device capable of independently driving each wheel, typified by an in-wheel motor. Alternatively, instead of the embodiment shown in FIG. 8, a steering device such as a steer-by-wire may be provided as the vehicle drive device, a steering controller is provided for the steering device, and the slip suppression control device may output a command to the steering controller.

The slip estimator 9 compares a calculated turning speed calculated by the speed calculation unit 7a of the standard turning speed calculator with a estimated turning speed estimated by the turning speed estimator. When the estimated turning speed is lower than the calculated turning speed, the slip estimator 9 can determine that, for example, the vehicle is in an excessive understeer state where the vehicle does not turn but runs straight. In other words, the calculated turning speed is used as a threshold, and, in a state where the estimated turning speed exceeds the threshold on the deceleration side, the slip determination unit 9b determines that the vehicle is in an excessive understeer state.

When the estimated turning speed is higher than the calculated turning speed, the slip estimator 9 can determine that, for example, the vehicle is in an excessive oversteer state where the vehicle tends to spin. The sideslip prevention control device 6C that prevents both understeer and oversteer can be configured by providing the slip estimator 9 with a function of determining both an understeer state and an oversteer state.

In the sideslip prevention control device 6C that prevents understeer, when turning acceleration of a vehicle body turning speed that is calculated with respect to a predetermined turning operation input by the speed calculation unit 7a of the standard turning speed calculator becomes higher than turning acceleration in a state where an excessive slip state has not actually occurred, a possibility that the slip determination unit 9b will erroneously determine that the current state is a slip state, arises. Thus, calculation is preferably performed such that the calculated turning acceleration of the vehicle body turning speed is at least lower than turning acceleration that actually occurs.

That is, the speed calculation unit 7a of the standard turning speed calculator may be configured to use, as an input, a value obtained by adding a predetermined bias value to a turning operation input or the like used as an input such that the input is decreased. In the sideslip prevention control device 6C that prevents oversteer such as spin, contrary to the case of preventing understeer, an input obtained by adding a predetermined bias value such that an input to the speed calculation unit 7a is increased is used.

In the sideslip prevention control device 6C that prevents understeer, for the motion feedback calculation unit 7b of the standard turning speed calculator, in order to prevent the calculation result of the speed calculation unit 7a from becoming a turning speed that is excessively low with respect to an actual turning speed, it is necessary to perform feedback calculation on the basis of the deviation between the calculation result of the speed calculation unit 7a and the estimation result of the turning speed estimator such that the calculated turning speed is increased. On the other hand, a situation where the calculation result of the speed calculation unit 7a greatly deviates from an actual turning speed is determined by the slip estimator 9 as an excessive understeer state, and thus in such a situation, it is not necessary to perform feedback calculation such that the calculated turning speed is decreased.

Specifically, the motion feedback calculation unit 7b feeds back, as an operation input value, a value obtained through a predetermined proportional gain from the deviation between the calculated turning speed and the estimated turning speed. In other words, the motion feedback calculation unit 7b performs feedback calculation in which the value obtained through the predetermined proportional gain G from the deviation between the calculated turning speed and the estimated turning speed is added to the operation input value (feature quantity). In this case, the motion feedback calculation unit 7b preferably has a function with one side limiter operation in which a deviation that further decreases the calculated turning speed is corrected to zero. In addition, in the sideslip prevention control device 6C that prevents oversteer such as spin, contrary to the case of preventing understeer, the motion feedback calculation unit 7b is configured to be provided with one side limiter operation in which a deviation that further increases the calculated turning speed is corrected to zero, in the case where the motion feedback calculation unit 7b feeds back, as an operation input value, the value obtained through the predetermined proportional gain from the deviation between the calculated turning speed and the estimated turning speed.

Each means or each function unit (the motion feedback calculation unit 7b, the speed estimation unit 8b, the slip determination unit 9b, etc.) within the vehicle control device 3 is specifically configured with a hardware circuit or a software mathematical function on a processor (not shown) which enables calculation and output of a result thereof, with use of a LUT (Look Up Table) implemented by software or hardware, or a prescribed transform function contained in a library of software or hardware equivalent thereto, and, as necessary, a comparison function or a four arithmetic operation function in the library or hardware equivalent thereto, etc.

In each embodiment described above, each block is conceptually provided to describe a function, implemented hardware or software need not be divided as shown in each drawing, and integration and division of each block may be made as appropriate in accordance with the convenience at the time of implementation. In addition, other components such as a power supply device not shown in the drawing may be provided as needed.

Although the present invention has been described above in connection with the preferred embodiments thereof with reference to the accompanying drawings, numerous additions, changes, and deletions can be made without departing from the gist of the present invention. Accordingly, such additions, changes, and deletions are to be construed as included in the scope of the present invention.

REFERENCE NUMERALS

1 . . . vehicle operation device
1A . . . brake operation device
2 . . . motion detector
4 . . . vehicle drive device
4A . . . brake device
7a . . . speed calculation unit
7b . . . motion feedback calculation unit
8b . . . speed estimation unit
9 . . . slip estimator

What is claimed is:

1. A vehicle control device for controlling a vehicle drive device in a vehicle including a vehicle operation device configured to perform an operation for at least one of a first force in a longitudinal direction of the vehicle and a second force in a turning direction of the vehicle, and a motion detector configured to detect at least one of a speed or acceleration in a predetermined direction of the vehicle, the vehicle drive device being configured to generate at least one of the first force and the second force of the vehicle based on an operation input value with respect to the vehicle operation device, the vehicle control device comprising:
   a speed calculation unit configured to calculate a calculation speed by calculating a speed in the predetermined direction of the vehicle based on a feature quantity represented by at least one of the operation input value with respect to the vehicle operation device and a driving force of the vehicle drive device;
   a speed estimation unit configured to estimate an estimation speed by estimating a speed in the predetermined direction of the vehicle based on the at least one of the speed or the acceleration detected by the motion detector;
   a motion feedback calculation unit configured to perform a feedback calculation in which a value is added to the feature quantity, the value obtained, through a proportional gain, from a deviation between the calculation speed calculated by the speed calculation unit and the estimation speed estimated by the speed estimation unit; and
   a slip estimator configured to compare the calculation speed calculated by the speed calculation unit with the estimation speed estimated by the speed estimation unit, and to estimate that the vehicle is in a slip state in the predetermined direction of the vehicle, when the estimation speed exceeds the calculation speed.

2. The vehicle control device as claimed in claim 1, wherein
the speed calculation unit is configured to correct the calculation speed calculated by the speed calculation unit based on the feedback calculation only if a correction amount determined by the motion feedback calculation unit would not result in a decrease to the calculation speed calculated by the speed calculation unit.

3. The vehicle control device as claimed in claim 1, wherein
the speed calculation unit is configured to add, to the feature quantity, a determined bias value for driving the vehicle if the determined bias value added to the feature quantity would result in an increase to the calculation speed calculated by the speed calculation unit,
the determined bias value is set to zero if the determined bias value for driving the vehicle added to the feature quantity would result in a decrease to the calculation speed calculated by the speed calculation unit, and
the feature quantity is represented by at least one of the operation input value with respect to the vehicle operation device and the driving force of the vehicle drive device.

4. The vehicle control device as claimed in claim 1, further comprising a vehicle motion estimator,
wherein
the vehicle drive device is a wheel drive device configured to provide a rotary torque to a wheel of the vehicle,
the speed calculation unit is configured to calculate an angular speed of the wheel that is synchronous with a longitudinal speed of the vehicle based on a calculation including at least one of the rotary torque of the wheel, the feature quantity, and a weight of the vehicle,
the vehicle motion estimator is configured to estimate an angular speed of the wheel based on a detection value of a motion detector configured to detect at least one of an angular acceleration, an angular speed, and an angle of the wheel, and
the slip estimator is configured to estimate a slip rate of the wheel based on a comparison between the angular speed of the wheel estimated by the vehicle motion estimator and the angular speed of the wheel calculated by the speed calculation unit.

5. The vehicle control device as claimed in claim 4, wherein
the vehicle drive device includes a plurality of wheel drive devices configured to be independently controlled,
the slip estimator is configured to perform a determination as to a slip state for each wheel driven by the plurality of wheel drive devices, and
the motion feedback calculation unit is configured to perform the feedback calculation only with respect to wheels that are determined to not be in the slip state by the slip estimator.

6. The vehicle control device as claimed in claim 1, wherein
the vehicle operation device includes a brake operation device,
the vehicle drive device includes a brake device, and
the speed calculation unit is configured to calculate the speed in the predetermined direction of the vehicle based on at least one of an operation input value by the brake operation device and a driving force of the brake device.

* * * * *